United States Patent Office  3,070,569
Patented Dec. 25, 1962

3,070,569
STABILIZING POLYETHYLENE WITH CARBON, A POLYMERIC PHENOL SULFIDE, AND AN ORGANIC REDUCING AGENT
Norman A. Rosenthal, Levittown, Pa., assignor to Thiokol Chemical Corporation, Bristol, Pa., a corporation of Delaware
No Drawing. Filed Oct. 8, 1959, Ser. No. 845,093
12 Claims. (Cl. 260—41)

This invention relates to a method of stabilizing polyethylene, and to stabilized polyethylene compositions.

Polyethylene is known in the art to be subject to oxidative degradation. Considerable attention has been given by those in the art to methods of stabilizing polyethylene against such degradation by the formulation of polyethylene compositions containing antioxidants. These antioxidants comprise a variety of materials such as phenols and secondary amines, for example.

In a later advance in the art, it was discovered that numerous sulfur compounds including thioethers, disulfides, and thiols showed considerable efficacy as antioxidants when incorporated into polyethylene in the presence of carbon black.

The present invention concerns the stabilization of polyethylene by the addition thereto of polymeric phenol sulfide antioxidants and carbon black in the presence of a reducing agent. This combination of polymeric phenol sulfide antioxidants with a reducing agent and carbon black shows unexpected synergistic effects.

The use in polyethylene compositions of a polymeric phenol sulfide with carbon black and a reducing agent is believed to bring about a fundamental change in the mechanism of antioxidant protection, and offers many advantages. Heretofore the observed behavior of antioxidants, as measured by the oxygen uptake of polyethylene samples, was one in which oxidation was negligible throughout an induction period ranging from 50 to 200 hours. After this initial induction period, a noticeable absorption of oxygen occurred increasing rapidly with time in an unpredictable auto-catalytic fashion. This type of behavior made estimation of the effective life of the antioxidant and of the quality of treated polyethylene samples difficult.

On the other hand, using the compositions of the present invention, oxygen consumption by a treated polyethylene sample occurs ab initio and increases in a linear fashion with time. The slope of this oxygen-uptake curve is so slight, however, that the amount of oxygen absorbed after long periods of time is extremely small as compared with the total oxygen uptake of samples protected by prior art materials. The use of the novel antioxidants herein described thus offers the twin advantages of both a very much greater degree of protection against oxidative degradation as well as a predictable variation of this protection with time.

The polymeric phenol sulfides described herein as antioxidants are polyphenol monosulfides (thioethers) and disulfides of a molecular weight advantageously between about 300 and about 400, preferably between about 325 to about 360. If a lesser or greater volatility of the materials is desired, the molecular weight may be increased or decreased above or below these levels, which are given to describe the most desirable compounds.

The polymers are conveniently prepared by reacting phenols with sulfur monochloride or sulfur dichloride in an inert solvent. On removal of the solvent, viscous liquids or tacky solids varying in color from yellow to brown are obtained.

Phenols of the general formula

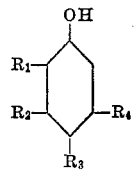

are preferred, where $R_2$ and $R_4$ are hydrogen or methyl, and $R_1$ and $R_3$ are hydrogen, a lower alkyl group having up to 12 carbon atoms, advantageously having up to 9 carbon atoms, a lower alkoxy group, or a phenyl group, but such that either $R_1$ or $R_3$ is hydrogen so that the molecule has both ortho positions, or an ortho and para position, unsubstituted. Exemplary materials of this type are: o-, m-, and p-cresols; o- and p-amyl phenols; o- and p-nonyl phenols; o- and p-dodecyl phenols; o- and p-tert. butyl phenols; 2-tert, butyl, 3-methyl phenol; guaicol, and o-phenyl phenol.

Reaction of these materials with $SCl_2$ or $S_2Cl_2$ is believed to produce polymers linked by monosulfide or disulfide links, respectively, through the ortho and para positions of the phenols (if these are both available) or through the unsubstituted ortho positions if the para position is blocked.

As can be seen from the following table, Table I, polyphenol monosulfide polymers generally show greater antioxidant activity than the corresponding polyphenol idsulfides. However, the latter materials are often unpredictably superior, and no general rule for preference can be drawn.

In Table I, $t_1$ is the time in hours for a polyethylene sample containing 0.25 percent by weight of antioxidant and 3 percent of carbon black to show detectible oxygen absorption. $t_5$ is the time in hours for a 5 p.s.i. reduction in pressure in an oxygen-filled bomb containing the sample. The measurements were made in bombs at 140° C., under an oxygen pressure of about 72 p.s.i. The samples were measured without added reducing agent.

TABLE I

| Material | $t_i$ | $t_5$ |
| --- | --- | --- |
| Poly-guaicol monosulfide | 60 | 126 |
| Poly-guaicol disulfide | 93 | 174 |
| Poly-o-Cresol monosulfide | 50 | 135 |
| Poly-o-Cresol disulfide | 12 | 70 |
| Poly-o-isoprop l phenol monosulfide | 76 | 129 |
| Poly-o-isopropyl phenol disulfide | | 83 |
| Poly-o-tert. butyl-m-methyl phenol monosulfide | 110 | 146 |
| Poly-o-tert. butyl-m-methyl phenol disulfide | 60 | 60 |
| Poly-o-tert. amyl phenol monosulfide | 92 | 122 |
| Poly-o-tert. amyl phenol disulfide | 172 | 254 |

In the preparation of polyphenol sulfides from the parent phenols, the phenols are reacted with sulfur monochloride ($S_2Cl_2$) or sulfur dichloride ($SCl_2$) to yield disulfide or monosulfide polymers respectively. After addition of either of these sulfur chlorides to the phenol, the materials are reacted by refluxing until evolution of HCl ceases. The sulfur chlorides are conveniently added slowly to a solution of the phenol in an inert solvent, i.e., one not readily reacting with the sulfur chlorides. Alkyl, aryl and alkaryl hydrocarbon solvents, such as hexane, benzene, toluene, xylene, etc. are commonly used in the art for this purpose. After addition of the sulfur chlorides, refluxing is carried out until the reaction is substantially completed (e.g., about ½ to about 3 hours). The solvents can conveniently be removed from the polymeric product by evaporation or distillation. A steam distillation, with or without a preliminary solvent distillation, is often used to free the polymer product of unreacted phenol. The phenol and sulfur chloride are advantageously reacted in a molar ratio of approximately 1:1. However, molar ratios of sulfide to phenol ranging between 0.4:1 and 1.1:1 are suitable. Using lower ratios within this range, low polymeric products predominate. With a ratio of about 0.6:1 to 0.8:1, tacky solids are obtained. At still higher ratios, relatively hard solids are obtained.

As reducing agents for incorporation into polyethylene with the polymers mentioned above, those reducing materials are suitable which, in their oxidized state, do not themselves oxidize polyethylene. In particular, thiourea, thiourea dioxide, and catechol are reducing agents of this type which show synergistic activity.

The antioxidant and reducing agent are both added to polyethylene in amounts between 0.1 percent and 0.5 percent by weight, but preferably with the reducing agent predominating. Compositions in which the reducing agent and antioxidant are present in a weight ratio of 3:1 have been found particularly advantageous. For any given ratio of reducing agent to antioxidant, the antioxidant protection obtained is roughly linearly proportional to the amount of combined materials present in the polyethylene.

Carbon black is added to polyethylene containing the antioxidant and reducing agent in amounts preferably between 0.25 and 5 percent by weight. An optimum addition is about 2 percent or 3 percent by weight, and amounts in excess of 5 percent show no greater efficacy than compositions containing 5 percent. Commercial carbon black is conveniently employed. This material comprises particles about 200 A. in size, but this dimension is not critical.

It is believed that the reducing agent functions in the composition by reducing hydroperoxides formed by oxidation of the polymeric antioxidant. In the absence of the reducing agent, hydroperoxides formed by oxidation of the antioxidant decompose autocatalytically and are lost. Addition of the reducing agent regenerates the antioxidant from these hydroperoxides, increasing the overall efficacy of the antioxidant. The reduction of the hydroperoxides is believed to occur other than by a free radical mechanism.

The following specific examples are intended to be illustrative, and are not to be construed as limiting the scope and spirit of the invention herein described.

*Example 1*

A monosulfide polymer of o-cresol was prepared as follows. 960 grams (10 moles) of o-cresol were dissolved in 1 liter of n-hexane. Approximately 721 grams (7 moles) of $SCl_2$ were added dropwise to the solution over a period of one hour, maintaining the temperature of the solution between 24–35° C. The resulting solution was refluxed for a period of one hour at a temperature between about 60–70° C. The solvent was then removed by a preliminary distillation, followed by a steam distillation to remove unreacted phenol. A polymeric product having an average molecular weight of about 292, and containing 22.4 percent sulfur, was obtained in 84 percent yield.

A similar reaction with $S_2Cl_2$ yields poly-o-cresol disulfide polymers.

A monosulfide o-cresol polymer prepared as described above showed synergistic effects as an antioxidant when combined with carbon black and a reducing agent, as shown in the following table. The additive materials were milled into polyethylene samples which were then subjected to a temperature of 140° C. in a bomb containing oxygen at a pressure of about 75 lbs. per square inch. The time period $t_1$ is the induction period, or time required to show a detectible absorption of oxygen. The time period $t_5$ is the time required for a 5 p.s.i. drop in the pressure of the bomb.

TABLE II

A = poly-o-cresol monosulfide (0.25 percent)
C = carbon black (3 percent)
R = thiourea dioxide (0.25 percent)

| Polyethylene plus | $t_i$ (hours) | $t_5$ (hours) |
|---|---|---|
| C+R | 24 | 43 |
| A+R | 75 | 85 |
| A+C | 50 | 135 |
| A+C+R | 0 | 356 |

*Example 2*

Combinations of an o-cresol monosulfide polymer as produced in Example 1 above with other reducing agents which do not oxidize polyethylene in their oxidized form also show synergistic effects. In the following Table III are tabulated the results obtained when thiourea is used as the reducing agent. The symbols of the table have their earlier significance.

TABLE III

A = poly-o-cresol monosulfide (0.25 percent)
C = carbon black (3 percent)
R = thiourea (0.25 percent)

| Polyethylene plus | $t_i$ (hours) | $t_5$ (hours) |
|---|---|---|
| C+R | 34 | 54 |
| A+R | 60 | 66 |
| A+C | 50 | 135 |
| A+C+R | 0 | 904 |

*Example 3*

Table IV below tabulates the results obtained when an antioxidant polymer prepared according to Example 1 is used in combination with carbon black and catechol as the reducing agent.

TABLE IV

A = poly-o-cresol monosulfide (0.25 percent)
C = carbon black (3 percent)
R = catechol (0.25 percent)
Pressure, 50 p.s.i.

| Polyethylene plus | $t_i$ (hours) | $t_5$ (hours) |
|---|---|---|
| A | 40 | 52 |
| A+C | 66 | 135 |
| A+R | 42 | 49 |
| A+C+R | 0 | 188 |

The data tabulated in the examples show that unusual and unexpected protection of polyethylene samples is afforded by concurrent use of the polymeric phenol sulfides described, with carbon black and a reducing agent which does not oxidize polyethylene in its oxidized state. Results are obtained which are more than additive, as compared with results achieved using various other combinations in which not all three of these components are present.

Although specific embodiments have been shown and described, it is to be understood that they are illustrative, and are not to be construed as limiting on the scope and spirit of the invention.

I claim:

1. A polyethylene composition stabilized against oxidation, said composition comprising polyethylene having uniformly dispersed therein between 0.25 and 5 percent by weight of finely divided carbon, between 0.1 and 0.5 percent by weight of an organic reducing agent selected from the group consisting of thiourea, thiourea dioxide, and catechol, and between 0.1 and 0.5 percent of a polymeric phenol sulfide selected from the group consisting of polymeric phenol monosulfides and disulfides.

2. A composition according to claim 1 wherein said sulfide is a polymeric phenol monosulfide.

3. A composition according to claim 1 wherein said sulfide is a polymeric phenol disulfide.

4. A composition according to claim 1 wherein said sulfide is a polymeric orthocresol monosulfide.

5. A composition according to claim 1 wherein said sulfide is a polymeric orthocresol disulfide.

6. A composition according to claim 1 wherein said polymeric phenol sulfide is a polymeric cresol monosulfide.

7. A composition according to claim 1 wherein said polymeric phenol sulfide is a polymeric cresol disulfide.

8. A composition according to claim 1 wherein said reducing agent is thiourea.

9. A composition according to claim 1 wherein said reducing agent is thiourea dioxide.

10. A composition according to claim 1 wherein said reducing agent is catechol.

11. A polyethylene composition as in claim 1 wherein said polymeric phenol sulfide is a polymeric sulfide of a phenol having the formula

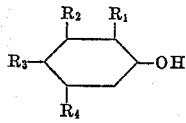

wherein $R_2$ and $R_4$ are selected from the group consisting of hydrogen and methyl, $R_1$ and $R_3$ are radicals selected from the group consisting of hydrogen, alkyl, alkoxy, and phenyl, and wherein one of said radicals $R_1$ and $R_3$ is hydrogen.

12. The method of stabilizing polyethylene against oxidation which comprises uniformly dispersing therethrough between 0.25 and 5 percent by weight of finely divided carbon, between 0.1 and 0.5 percent by weight of an organic reducing agent selected from the group consisting of thiourea, thiourea dioxide, and catechol, and between 0.1 and 0.5 percent of a polymeric phenol sulfide selected from the group consisting of polymeric phenol monosulfides and disulfides.

References Cited in the file of this patent

UNITED STATES PATENTS

| | | |
|---|---|---|
| 2,477,872 | Haury | Aug. 2, 1949 |
| 2,605,249 | Albert | July 29, 1952 |
| 2,964,498 | Taylor | Dec. 13, 1960 |
| 2,967,846 | Hawkins et al. | Jan. 10, 1961 |

FOREIGN PATENTS

| | | |
|---|---|---|
| 701,468 | Great Britain | Dec. 23, 1953 |
| 772,938 | Great Britain | Apr. 17, 1957 |
| 796,285 | Great Britain | June 11, 1958 |